United States Patent
Vollmar et al.

[19]

[11] Patent Number: 6,162,556

[45] Date of Patent: Dec. 19, 2000

[54] METHOD FOR OPERATING A HIGH-TEMPERATURE FUEL CELL INSTALLATION, AND A HIGH-TEMPERATURE FUEL CELL INSTALLATION

[75] Inventors: Horst Vollmar, Herzogenaurach; Heiner Edelmann, Weisendorf; Wolfgang Schrepfer, Herzogenaurach; Christoph Nölscher, Nürnberg, all of Germany

[73] Assignee: Siemens Aktiengesellschaft, Munich, Germany

[21] Appl. No.: 09/090,560

[22] Filed: Jun. 4, 1998

Related U.S. Application Data

[63] Continuation of application No. PCT/DE96/02237, Nov. 21, 1996.

[30] Foreign Application Priority Data

Dec. 4, 1995 [DE] Germany .......................... 195 45 186

[51] Int. Cl.[7] .................................................. H01M 8/06
[52] U.S. Cl. .................................................. 429/17; 429/20
[58] Field of Search .................................. 429/17, 19, 20

[56] References Cited

U.S. PATENT DOCUMENTS

| | | | |
|---|---|---|---|
| 4,547,356 | 10/1985 | Papineau | 429/19 X |
| 4,743,516 | 5/1988 | Noguchi et al. | 429/17 X |
| 4,772,634 | 9/1988 | Farooque | 429/17 X |
| 4,917,971 | 4/1990 | Farooque | 429/19 |
| 4,946,750 | 8/1990 | Nomden | 429/17 |
| 4,994,331 | 2/1991 | Cohen | 429/20 X |
| 5,034,287 | 7/1991 | Kunz | 429/13 |

FOREIGN PATENT DOCUMENTS

| | | |
|---|---|---|
| 0246649 A1 | 11/1987 | European Pat. Off. . |
| 0401834 A1 | 12/1990 | European Pat. Off. . |
| 0404712 A2 | 12/1990 | European Pat. Off. . |
| 0430017 A2 | 6/1991 | European Pat. Off. . |
| 0473153 A2 | 3/1992 | European Pat. Off. . |
| 0673074 A1 | 9/1995 | European Pat. Off. . |
| 4032652 A1 | 4/1992 | Germany . |
| 4340623 A1 | 3/1994 | Germany . |

OTHER PUBLICATIONS

Publication of Abstract No. 1046B (Yasuo, M. et al.) "Development of Internal Reforming MCFC with Petroleum Light Fuels", dated May 16–21, 1993.

"Erzeugung und Konditionierung von Gasen für den Einsatz in Brennstoffzellen" [Production and Conditioning of Gases of Use in Fuel Cells] —VDI Report 1174 (Van Heek, K.H.), pp. 97–115. (1995 Month unknown).

"Verfahrenstechnik der Hochtemperaturbrennstoffzelle" [Process Technology of High Temperature Fuel Cells]— VDI Report 1174 (Riensche, E.), pp. 63–78 (1995 Month Unknown).

(List continued on next page.)

*Primary Examiner*—Stephen Kalafut
*Attorney, Agent, or Firm*—Herbert L. Lerner; Laurence A. Greenberg; Werner H. Stemer

[57] ABSTRACT

The invention relates a method for operating a high-temperature fuel cell installation having a high-temperature fuel cell module. The method includes the step of producing a combustion gas having a combustion gas power for an electrochemical reaction in a high-temperature fuel cell module by a reformation process using a heat content from the electrochemical reaction in the high-temperature fuel cell module for reforming the combustion gas. The method includes the step of producing excess hydrogen that is not consumed during the electrochemical reaction in the high-temperature fuel cell module. There is the step of operating cells of the high-temperature fuel cell module with a cell voltage of less than about 0.7 V. Finally, there is the step of storing the excess hydrogen that was not consumed in the electrochemical reaction outside of the high-temperature fuel cell module. In this manner, one optimizes the effectiveness of the high-temperature fuel cell installation. In addition, the invention relates a high-temperature fuel cell installation.

18 Claims, 2 Drawing Sheets

OTHER PUBLICATIONS

Japanese Patent Abstract No. 62140375 (Yoshioka, S. et al.) dated Jun. 23, 1987.

Japanese Patent Abstract No. 01076676 (Nagai C. et al.) dated Mar. 22, 1989.

Japanese Patent Abstract No. 04115466 (Nagi C. et al.) dated Sep. 5, 1990.

Japanese Patent Abstract No. 01143154 (Tanaka, J.) dated Jun. 5, 1989.

METHOD FOR OPERATING A HIGH-TEMPERATURE FUEL CELL INSTALLATION, AND A HIGH-TEMPERATURE FUEL CELL INSTALLATION

CROSS REFERENCE TO RELATED APPLICATION

This application is a continuation of International application Ser. No. PCT/DE96/02237, filed Nov. 21, 1996, which designated the United States.

BACKGROUND OF THE INVENTION

1. Field of the Invention

The invention relates to a method for operating a high-temperature fuel cell installation, and a high-temperature fuel cell installation.

Fuels that contain hydrocarbons such as natural gas, heating oil, naphtha and biogas are used for operating high-temperature fuel cell installations. As a rule, these fuels have to be processed in a suitable manner. That is to say, the gas must be reformed before it is fed to the high-temperature fuel cells. The individual high-temperature fuel cells are combined to form high-temperature fuel cell modules.

After being moistened, the fuels containing hydrocarbons pass through a reformation process during which $CO$, $H_2$, $CO_2$ and $H_2O$ are produced as gaseous reformation products. The gaseous reformation products, which are also called reformate, now form a suitable combustion gas for the operation of the high-temperature fuel cell module.

The process of reformation may in this case be carried out externally or internally, that is to say inside or outside of the high-temperature fuel cell module with or without using the enthalpy of an anode exhaust gas from the high-temperature fuel cell module.

Internal reformation is known, for example, from the report "Verfahrenstechnik der Hochtemperaturbrennstoffzelle" [Process Engineering For High-Temperature Fuel Cells] by E. Riensche, VDI Reports 1174 (1995), pages 63 to 78, in which high-enthalpy waste heat that is produced during the electrochemical combustion in the high-temperature fuel cell module is used for internal reformation of the combustion gas. If the reformation is carried out in the high-temperature fuel cell module but outside an anode part, the process is called indirect internal reformation. Reformation in the anode part is correspondingly called direct internal reformation.

The external reformers which are known for performing the external reformation process, in particular from the report "Erzeugung und Konditionierung von Gasen für den Einsatz in Brennstoffzellen" [Production And Conditioning Of Gases For Use In Fuel Cells] by K. H. van Heek, VDI Reports 1174 (1995), pages 97 to 116, are configured and constructed such that the amount of combustion gas that is reformed corresponds exactly to the amount required for conversion in the high-temperature fuel cell module for the electrochemical combustion. This configuration applies equally to direct and indirect internal reformation.

Further fuel cell installations are known to include at least one fuel cell stack composed of individual cells (a modular structure) that have an anode part and a cathode part. The combustion gas that is required for the electrochemical reaction being produced by the reformation process in these installations are known from Non-Prosecuted German Patent Application Nos. 43 30 623 A1 and 40 32 652 A1 and from European Patent Application 0 430 017 A2.

The high-temperature fuel cell installations that are known from the prior art are configured for optimally high combustion gas utilization in the electrochemical reaction. The reformed combustion gas is thus used exclusively for the purpose of utilization within the high-temperature fuel cell installation.

As a result of this configuration, a combustion gas concentration gradient exists over the entire active area for the electrochemical reaction within the high-temperature fuel cell module. This results in a weakening of the combustion gas over the active area and may amount to up to 80–90% at the output from the high-temperature fuel cell module. This weakening leads to diffusion constriction within the electrolyte in the high-temperature fuel cell module, which, in turn, leads to considerable reductions in the power density of the high-temperature fuel cell module.

SUMMARY OF THE INVENTION

It is accordingly an object of the invention to provide a method for operating a high-temperature fuel cell installation, and a high-temperature fuel cell installation, which overcome the above-mentioned disadvantages of the prior art devices and methods of this general type, and which provide a method for operating a high-temperature fuel cell installation in which the effectiveness of a high-temperature fuel cell installation is optimized. In addition, high-temperature fuel cell installations for carrying out the method will also be specified.

With the foregoing and other objects in view there is provided, in accordance with the invention, a method for operating a high-temperature fuel cell installation having a high-temperature fuel cell module with fuel cells, which includes producing a combustion gas having a combustion gas power for an electrochemical reaction in a high-temperature fuel cell module by a reformation process using a heat content from the electrochemical reaction in the high-temperature fuel cell module for reforming the combustion gas and the electrochemical reaction in the high-temperature fuel cell module produces more hydrogen than is consumed in the electrochemical reaction; operating cells of the high-temperature fuel cell module with a cell voltage of less than about 0.7 V; and storing unconsumed, excess hydrogen that was not consumed in the electrochemical reaction outside of the high-temperature fuel cell module.

The combustion gas that is required for the electrochemical reaction is produced by a reformation process, with more hydrogen $H_2$ being produced than is consumed during the electrochemical reaction in the high-temperature fuel cell module. The hydrogen $H_2$ that is not consumed in the high-temperature fuel cell module is collected for further use outside of the high-temperature fuel cell module.

The excess hydrogen $H_2$ which is produced directly from the reformation is supplied, using a storage apparatus or reservoir, for example to other mobile or stationary installations which require hydrogen $H_2$ for operation. In addition, the hydrogen $H_2$ can be fed directly to a hydrogen user, without using any additional storage reservoir. The consumer may be represented, for example, by any possible application in various fields of industry, for example in the chemical industry, in which hydrogen $H_2$ is used. Since the high-temperature fuel cell installation includes the reservoir and the consumer within the configuration for efficiency, the effectiveness, that is to say in other words the efficiency of the entire high-temperature fuel cell installation is improved.

In addition, the power density of the high-temperature fuel cell module is at the same time optimized since the high concentration of the combustion gas over the entire active area of the high-temperature fuel cell module means that the electrical power density is higher than in the case of the high-temperature fuel cell installations which are known from the prior art and are configured for high combustion gas utilization in the high-temperature fuel cell module. In the case of known high-temperature fuel cell installations, a diffusion constriction exists which leads to considerable reductions in power or weakening of the combustion gas. The combustion gas may be weakened by an amount between 80 and 90% by the time it reaches a discharge path from the anode part.

In addition, the high-temperature fuel cell module need not be configured for high cell efficiency. Instead, a cell voltage which under some circumstances is considerably reduced can be chosen, for example a cell voltage of 0.5 to 0.7 V instead of a cell voltage of 0.8 V. This results in a significantly increased power density than in a high-temperature fuel cell installation optimized for current production. Thus, as a result of these two effects, less active area is required for a given electrical power than in the case of known high-temperature fuel cell installations. The increased heat losses which result from the fact that the electrical efficiency is reduced when the cell voltage is reduced can then essentially be used for additional reformation in the case of the present method. This measure allows for cooling of the high-temperature fuel cell module to be significantly reduced by up to 10 times that of excess air used in the prior art. The air throughput remains limited to the amount necessary for the electrochemical reaction in the high-temperature fuel cell module. Air fans, air heating exchangers and air ducts are correspondingly of smaller size, as a result of which the apparatus complexity is reduced and, in addition, costs are saved.

In accordance with an added feature of the invention, there is the step of using at least 30% of the combustion gas power to produce the excess, unconsumed hydrogen. At least 30% of the combustion gas power is preferably used to produce the unconsumed hydrogen $H_2$. In particular, the heat content from the electrochemical combustion in the high-temperature fuel cell module is used for reforming the combustion gas.

In accordance with another feature of the invention, there is the step of reforming the combustion gas within the high-temperature fuel cell module.

In accordance with an additional feature of the invention, there is the step of reforming the combustion gas before the combustion gas enters the high-temperature fuel cell module.

With the foregoing and other objects in view there is also provided, in accordance with the invention, a high-temperature fuel cell installation, includes: at least one high-temperature fuel cell module having an anode part and a cathode part, the at least one high-temperature fuel cell module receives a combustion gas for producing an electrochemical reaction, a heat content from the electrochemical reaction is used for reforming the combustion gas, and the electrochemical reaction in the high-temperature fuel cell module produces more hydrogen than is consumed in the electrochemical reaction; an anode discharge path connected to the anode part for receiving unconsumed hydrogen; and an apparatus for receiving and storing the unconsumed hydrogen disposed in the anode discharge path.

With the foregoing and other objects in view there is further provided, in accordance with the invention, a high-temperature fuel cell installation, includes: at least one high-temperature fuel cell module having an anode part and a cathode part, the at least one high-temperature fuel cell module receives a combustion gas for producing an electrochemical reaction, a heat content from the electrochemical reaction is used for reforming the combustion gas, and the electrochemical reaction in the high-temperature fuel cell module produces more hydrogen than is consumed in the electrochemical reaction; an anode discharge path connected to the anode part for receiving excess hydrogen; and an apparatus for consuming the excess hydrogen is disposed in the anode discharge path.

In accordance with an added feature of the invention, there is a reformer disposed within the at least one high-temperature fuel cell module for reforming combustion gas for use in an electrochemical reaction in the at least one high-temperature fuel cell module. In particular, the combustion gas is reformed within the high-temperature fuel cell module. Consequently, the heat content of the electrochemical combustion is supplied directly to the reformation without any additional external lines for transferring the heat content.

A reformer disposed within the high-temperature fuel cell module is preferably provided for reforming the combustion gas for an electrochemical reaction. At least part of the area of this internal reformer, in which the reformation takes place, is integrated, for example, in the anode part of the high-temperature fuel cell module. This measure avoids the need for an external reformer, which is not arranged within the high-temperature fuel cell module.

In accordance with another feature of the invention, there is a feed path and at least one heat exchanger disposed in the feed path, the at least one heat exchanger is also disposed in the anode discharge path for transferring a heat content of an anode exhaust gas flowing in the anode discharge path to the reformer via the feed path. In particular, at least one heat exchanger is provided in the discharge path from the anode part for transferring the heat content of an anode exhaust gas via a feed path to the reformer that is disposed within the high-temperature fuel cell module.

In accordance with an additional feature of the invention, there is a shift reactor for producing hydrogen disposed in the anode discharge path.

In accordance with another added feature of the invention, the at least one heat exchanger is one of at least two heat exchangers disposed in the anode discharge path, and the shift reactor is disposed between the at least two heat exchangers.

In accordance with another additional feature of the invention, there is a cathode discharge path connected to the cathode part, and at least one further heat exchanger disposed in the cathode discharge path for emitting a heat content of a cathode exhaust gas flowing in the cathode discharge path.

In accordance with yet another added feature of the invention, there is a feed path connected to the anode part, and a reformer disposed outside of the high-temperature fuel cell module in the feed path. In particular, the combustion gas is reformed before entering the high-temperature fuel cell module. A reformer disposed outside the high-temperature fuel cell module is in this case heated using the heat content of an anode exhaust gas.

In accordance with yet another additional feature of the invention, there is a cathode discharge path connected to the cathode part and the reformer for transferring a heat content of a cathode exhaust gas flowing in the cathode discharge path to the reformer.

In accordance with yet another feature of the invention, there is a further discharge branch disposed between the cathode discharge path and the reformer for transferring the heat content of the cathode exhaust gas to the reformer.

In accordance with a concomitant feature of the invention, there is an anode discharge path connected between the anode part and the reformer for transferring the heat content of an anode exhaust gas flowing in the anode discharge path to the reformer.

Other features which are considered as characteristic for the invention are set forth in the appended claims.

Although the invention is illustrated and described herein as embodied in a method for operating a high-temperature fuel cell installation, and a high-temperature fuel cell installation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
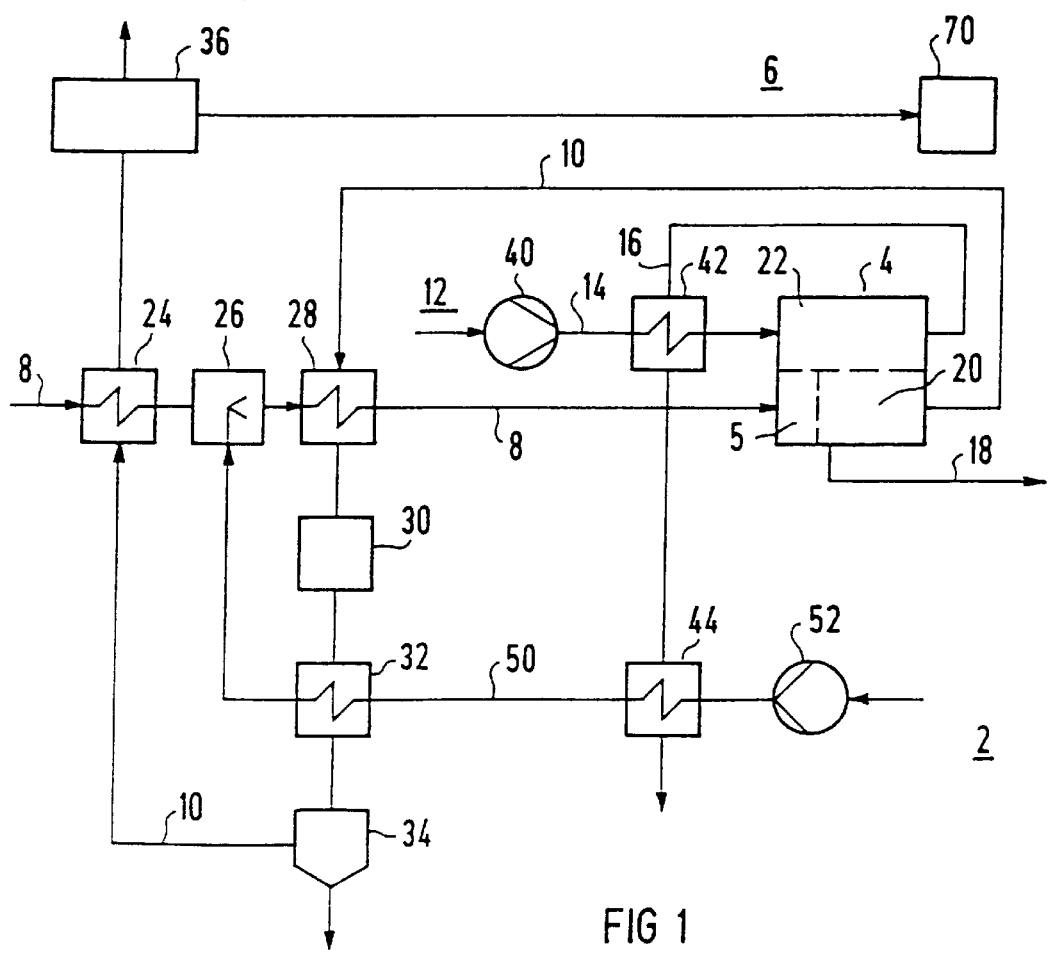
FIG. 1 is a block diagram of a high-temperature fuel cell installation according to the invention.

Referring now to the figures of the drawing in detail and first, particularly, to FIG. 1 thereof, there is shown a high-temperature fuel cell installation 2 having a high-temperature fuel cell module 4 with a reformer 5 for reforming a combustion gas for the high-temperature fuel cell module 4.

The high-temperature fuel cell module 4 also includes an anode part 20 and a cathode part 22. The reformer 5 is in this case integrated in the anode part 20. In an embodiment that is not illustrated, the reformer 5 is located outside the anode part 20, but within the high-temperature fuel cell module 4.

In addition, the high-temperature fuel cell installation 2 has an anode path 6 which in turn has a feed path 8 to the anode part 20 of the high-temperature fuel cell module 4, a discharge path 10 from the anode part 20 of the high-temperature fuel cell module 4, a cathode path 12 which includes a feed path 14 to the cathode part 22 of the high-temperature fuel cell module 4, and a discharge path 16 from the cathode part 22 of the high-temperature fuel cell module 4.

A fuel that contains hydrocarbons is fed via the feed path 8 of the anode path 6 into the reformer 5 of the high-temperature fuel cell module 4, and is reformed therein. The combustion gas produced during the reformation process is subsequently partially subjected to the electrochemical reaction in the high-temperature fuel cell module 4.

During the reformation in the reformer 5, more combustion gas is reformed than is consumed during the electrochemical reaction in the high-temperature fuel cell module 4. Overall, at least 10 to 30% of the combustion gas power is converted into excess hydrogen $H_2$, particularly at cell voltages of less than 0.8 V. The theoretical upper limit is, for example, 55 to 85% for the reformation of methane, with cell voltages of 0.5 to 0.8 V. Consequently, excess hydrogen $H_2$ is produced, and is supplied via the discharge path 10 of the anode path 6 from the anode part 20 to an apparatus 70 for further use. The apparatus 70 may be a reservoir or a consumer of hydrogen which, in turn, may be, for example, part of the overall high-temperature fuel cell installation.

A heat exchanger 24, a water injector 26 and a further heat exchanger 28 are disposed in sequence in the flow direction of the feed path 8. The fuel that contains hydrocarbons is heated in the heat exchangers 24, 28 and is moistened with water vapor in the water injector 26.

The heat exchanger 28, a shift reactor 30, an additional heat exchanger 32, a water extractor 34, the heat exchanger 24, a hydrogen separating apparatus 36 and the apparatus 70 are disposed in sequence in the flow direction in the discharge path 10 of the anode part 20 of the high-temperature fuel cell module 4.

The anode exhaust gas in the discharge path 10 essentially contains carbon monoxide CO, hydrogen $H_2$, water $H_2O$ and carbon dioxide $CO_2$. The proportion of carbon monoxide CO and of hydrogen $H_2$ contained in the anode exhaust gas is typically at least between 10 to 30% of the calorific value of the hydrocarbons supplied to the high-temperature fuel cell module 4 with the fuel via the feed path 8.

The anode exhaust gas in the discharge path 10 from the anode part 20 transfers part of its heat content in the heat exchanger 28 to the fuel for the anode part 20 in the feed path 8 of the anode path 6. Water is supplied via a line 50 to the water injector 26 in the feed path 8.

A pump 52, a further heat exchanger 44 and the heat exchanger 32 are arranged in the flow direction of the water in the line 50.

A majority of the carbon monoxide CO is converted together with the water $H_2O$ in the anode exhaust gas into carbon dioxide $CO_2$ and hydrogen $H_2$ in the shift reactor 30, which can preferably also be integrated in the adjacent heat exchangers 28, 32. A shift reaction for conversion of carbon monoxide CO and water $H_2O$ into carbon dioxide $CO_2$ and hydrogen $H_2$ takes place not only in the shift reactor 30 but also, to some extent, over the entire length of the discharge path 10 from the anode part 20. Consequently, the entire discharge path 10 from the anode part 20 serves for enrichment of hydrogen $H_2$ from the anode exhaust gas.

Subsequently, in the heat exchanger 32, the anode exhaust gas transfers a further portion of its heat content to the water in the line 50.

A proportion of the water is removed from the anode exhaust gas in the water extractor 34. The anode exhaust gas transfers a further portion of its heat content, in the heat exchanger 24, to the fuel in the feed path 8 for the anode part 20 of the high-temperature fuel cell module 4. All the components that are present in the anode exhaust gas, as well as the hydrogen $H_2$, are separated in the hydrogen separating apparatus 36 so that essentially only the hydrogen $H_2$ is still present in the last part of the discharge path 10 and is subsequently supplied to the apparatus 70.

An oxidant, for example air or oxygen, is supplied via the feed path 14 of the cathode path 12 to the cathode part 22 of the high-temperature fuel cell module 4. A compressor 40 and a heat exchanger 42 are disposed in the flow direction in the feed path 14. The oxidant is compressed in the compressor 40, in the process of which it is also possible to set the required flow rate of oxidant, and this is subsequently heated in the heat exchanger 42.

Once the reaction has taken place in the cathode part 22 of the high-temperature fuel cell module 4, the cathode exhaust gas is passed to the outside air via the discharge path 16 of the cathode part 22 in which the heat exchangers 42, 44 are disposed. In the heat exchanger 42, the heated cathode exhaust gas from the cathode part 22 transfers a portion of its heat content to the oxidant in the feed path 14 for the cathode part 22.

The use of the heat exchangers 24, 28, 32, 42 and 44 results in the heat content of the cathode exhaust gas and anode exhaust gas from the high-temperature fuel cell module 4 being used for fuel and oxidant preheating, and thus for reformation.

Figure 2:
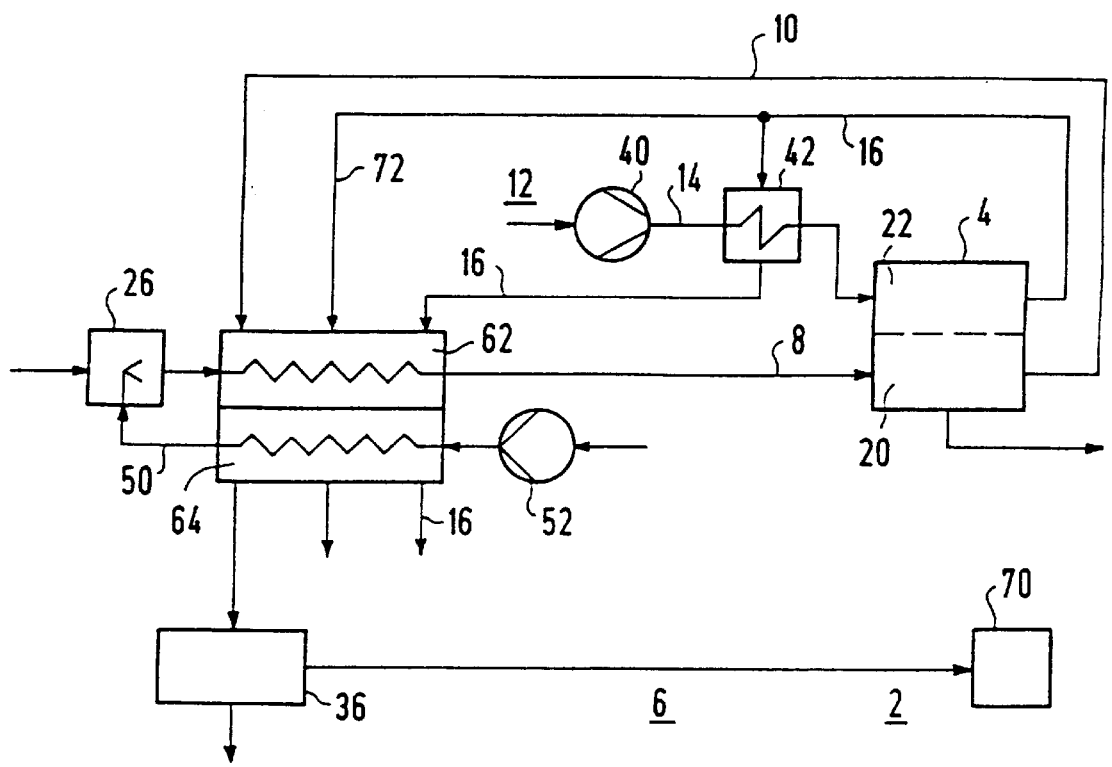
FIG. 2 is a block diagram of a second embodiment of the high-temperature fuel cell installation.

According to the high-temperature fuel cell installation 2 shown in FIG. 2, a reformer 62 is disposed outside the high-temperature fuel cell module 4, downstream from the water injector 26 of the flow direction contained in the feed path 8 for the anode part 20. The heat exchangers 24, 28 in the embodiment in FIG. 1 are omitted. In contrast to the embodiment in FIG. 1, the combustion gas is no longer reformed within the high-temperature fuel cell module 4 but in the external reformer 62. In this manner the combustion gas is at least partially reformed even before it is fed into the anode part 20.

The exhaust gas from the anode part 20 emits part of its heat content to the reformer 62 via the discharge path 10. An evaporator 64 is disposed downstream from the reformer 62 in the discharge path 10 from the anode part 20 and, in it, the exhaust gas transfers a further part of its heat content to the water vapor in order to moisten the fuel for the reformer 62. Subsequently, the exhaust gas from the anode part 20 passes through the hydrogen separating apparatus 36. The anode exhaust gas now contains only hydrogen $H_2$ downstream from the hydrogen separating apparatus 36 and is supplied to the apparatus 70.

The cathode exhaust gas is supplied to the external reformer 62 via the discharge path 16 from the cathode part 22 in which the heat exchanger 42 is disposed. After emitting a portion of its heat content in order to reform the combustion gas for the anode part 20, the cathode exhaust gas passes through the evaporator 64 where a further portion of its heat content is emitted to the water for moistening of the fuel for the reformer 62. The cathode exhaust gas, which essentially contains air, is then emitted to the outside air.

A discharge branch 72 branches off from the discharge path 16 from the cathode part 22 between the cathode part 22 and the heat exchanger 42. The discharge branch 72 feeds a portion of the cathode exhaust gas from the cathode part 22 directly to the external reformer 62 to emit its heat content. Once part of its heat content has been emitted, this portion of the cathode exhaust gas passes through the evaporator 64 and is then likewise emitted to the outside air.

We claim:

1. A method for operating a high-temperature fuel cell installation having a high-temperature fuel cell module with fuel cells, which comprises:
   producing a combustion gas having a combustion gas power for an electrochemical reaction in a high-temperature fuel cell module by a reformation process using a heat content from the electrochemical reaction in the high-temperature fuel cell module and producing more hydrogen than being consumed in the electrochemical reaction;
   operating cells of the high-temperature fuel cell module with a cell voltage of less than about 0.8 V;
   storing unconsumed, excess hydrogen that was not consumed in the electrochemical reaction outside of the high-temperature fuel cell module; and
   using at least 30% of the combustion gas power to produce the unconsumed, excess hydrogen.

2. The method according to claim 1, which comprises reforming the combustion gas within the high-temperature fuel cell module.

3. The method according to claim 1, which comprises reforming the combustion gas before the combustion gas enters the high-temperature fuel cell module.

4. A high-temperature fuel cell installation, comprising:
   at least one high-temperature fuel cell module having an anode part and a cathode part;
   a reformer for reforming the combustion gases for the electrochemical reaction;
   a hydrogen separation apparatus in the discharge path of the anode part separating the hydrogen from the combustion gas;
   a heat conduit for conducting enough heat produced in the high-temperature fuel cell to the reformer to use at least 30% of the combustion gas power to produce excess hydrogen not used for the electrochemical reaction.

5. The high-temperature fuel cell installation according to claim 4, wherein said reformer is disposed within said at least one high-temperature fuel cell module for reforming combustion gas for use in an electrochemical reaction in said at least one high-temperature fuel cell module.

6. The high-temperature fuel cell installation according to claim 4, wherein said reformer is disposed within said at least one high-temperature fuel cell module for reforming combustion gas for use in an electrochemical reaction in said at least one high-temperature fuel cell module.

7. The high-temperature fuel cell installation according to claim 6, including a feed path and at least one heat exchanger disposed in said feed path, said at least one heat exchanger also disposed in said anode discharge path for transferring a heat content of an anode exhaust gas flowing in said anode discharge path to said reformer via said feed path.

8. The high-temperature fuel cell installation according to claim 7, including a shift reactor for producing hydrogen disposed in said anode discharge path.

9. The high-temperature fuel cell installation according to claim 8, wherein said at least one heat exchanger is one of at least two heat exchangers disposed in said anode discharge path, and said shift reactor is disposed between said at least two heat exchangers.

10. The high-temperature fuel cell installation according to claim 6, including a cathode discharge path connected to said cathode part, and at least one further heat exchanger disposed in said cathode discharge path for emitting a heat content of a cathode exhaust gas flowing in said cathode discharge path.

11. The high-temperature fuel cell installation according to claim 4, including a feed path connected to said anode part, and a reformer disposed outside of said high-temperature fuel cell module in said feed path.

12. The high-temperature fuel cell installation according to claim 11, including a cathode discharge path connected to said cathode part and said reformer for transferring a heat content of a cathode exhaust gas flowing in said cathode discharge path to said reformer.

13. The high-temperature fuel cell installation according to claim 11, including an anode discharge path connected between said anode part and said reformer for transferring a heat content of an anode exhaust gas flowing in said anode discharge path to said reformer.

14. The high-temperature fuel cell installation according to claim 12, including a discharge branch disposed between said cathode discharge path and said reformer for transferring the heat content of the cathode exhaust gas to said reformer.

15. The high-temperature fuel cell installation according to claim 14, including an apparatus for consuming the excess hydrogen disposed in said anode discharge path.

16. A method for operating a high-temperature fuel cell installation having a high-temperature fuel cell module with fuel cells, which comprises:

producing a combustion gas having a combustion gas power for an electrochemical reaction in a high-temperature fuel cell module by a reformation process using enough heat content from the electrochemical reaction in the high-temperature fuel cell module for producing the combustion gas and producing more hydrogen than being consumed in the electrochemical reaction;

operating cells of the high-temperature fuel cell module with a cell voltage of less than about 0.8 V; and storing unconsumed, excess hydrogen that was not consumed in the electrochemical reaction outside of the high-temperature fuel cell module.

17. The method according to claim 16, which comprises reforming the combustion gas within the high-temperature fuel cell module.

18. The method according to claim 16, which comprises reforming the combustion gas before the combustion gas enters the high-temperature fuel cell module.

* * * * *